United States Patent
Tsai (10) Patent No.: US 9,992,255 B2
(45) Date of Patent: Jun. 5, 2018

(54) APPARATUSES AND METHODS FOR APPLICATION-SPECIFIC CONGESTION CONTROL FOR DATA COMMUNICATION (ACDC), AND STORAGE MEDIUM THEREOF

(71) Applicant: Acer Incorporated, New Taipei (TW)

(72) Inventor: Wei-Chieh Tsai, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 136 days.

(21) Appl. No.: 15/005,287

(22) Filed: Jan. 25, 2016

(65) Prior Publication Data
US 2017/0012877 A1   Jan. 12, 2017

Related U.S. Application Data

(60) Provisional application No. 62/190,399, filed on Jul. 9, 2015.

(51) Int. Cl.
| | |
|---|---|
| H04L 1/00 | (2006.01) |
| H04L 29/08 | (2006.01) |
| H04L 29/12 | (2006.01) |
| H04L 12/859 | (2013.01) |
| H04W 48/14 | (2009.01) |

(52) U.S. Cl.
CPC .......... *H04L 67/02* (2013.01); *H04L 47/2475* (2013.01); *H04L 61/1511* (2013.01); *H04L 61/2007* (2013.01); *H04W 48/14* (2013.01)

(58) Field of Classification Search
CPC . H04L 47/10; H04L 61/1511; H04L 61/2007; H04L 67/02; H04W 48/06; H04W 88/02; H04W 48/14

USPC .......................................................... 370/229
See application file for complete search history.

(56) References Cited

U.S. PATENT DOCUMENTS

| | | | |
|---|---|---|---|
| 2006/0112176 A1* | 5/2006 | Liu ................... | H04L 29/12066 709/245 |
| 2016/0014632 A1* | 1/2016 | Siow ..................... | H04L 5/0085 370/230 |
| 2016/0219024 A1* | 7/2016 | Verzun .................. | H04L 63/102 |

FOREIGN PATENT DOCUMENTS

| | | |
|---|---|---|
| CN | 102724189 | 10/2012 |
| JP | 2009271842 | 11/2009 |

OTHER PUBLICATIONS

European Search Report dated May 18, 2016, issued in application No. 16153108.2-1853.
(Continued)

*Primary Examiner* — Sai Ming Chan
(74) *Attorney, Agent, or Firm* — McClure, Qualey & Rodack, LLP (57) ABSTRACT

A mobile communication device including a wireless transceiver and a controller is provided. The wireless transceiver performs wireless transmission and reception to and from a cell. The controller determines whether an Application-specific Congestion control for Data Communication (ACDC) has been enabled in the cell in response to a Domain Name Server (DNS) query or Internet Protocol (IP) packet initiated by an application, and in response to the ACDC having been enabled, responds to the DNS query with an IP address or transmits the IP packet to the cell via the wireless transceiver only when the application is associated with a high-priority service.

15 Claims, 6 Drawing Sheets

(56) References Cited

OTHER PUBLICATIONS

"NTT Docomo—APN based ACDC;" 3GPP TSG WG1 Meeting #91; Apr. 2015; pp. 1-12.
"NTT Docomo—ACDC activiation for UE—initiated applications;" 3GPP TSG-SA WG1 #60; Nov. 2012; pp. 1-2.
"Ericsson—Packet filters based ACDC solution;" 3GPP TSG-CT WG1 #92; May 2015; pp. 1-2.
"3GPP TSG CT WG1: LS on security of ACDC solution;" 3GPP TSG-CT WG1 #92; May 2015; pp. 1.

* cited by examiner

APPARATUSES AND METHODS FOR APPLICATION-SPECIFIC CONGESTION CONTROL FOR DATA COMMUNICATION (ACDC), AND STORAGE MEDIUM THEREOF

CROSS REFERENCE TO RELATED APPLICATIONS

This Application claims priority of U.S. Provisional Application No. 62/190,399, filed on Jul. 9, 2015, the entirety of which is incorporated by reference herein.

BACKGROUND OF THE APPLICATION

Field of the Application

The application generally relates to congestion control technology, and more particularly to Application-specific Congestion control for Data Communication (ACDC).

Description of the Related Art

With growing demand for ubiquitous computing and networking, various wireless technologies have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and Time-Division LTE (TD-LTE) technology, etc.

Using LTE technology as an example, the Application-specific Congestion control for Data Communication (ACDC) was first introduced in Release 13 of the 3rd Generation Partnership Project (3GPP) specifications. ACDC aims to provide a more flexible access control mechanism based on the purpose of the UE's access attempt. Basically, ACDC groups applications in categories of importance, and it applies access controls to lesser categories first, sparing more important applications (e.g., for emergency purposes) from denial or deferral of access until and unless the level of congestion is severe enough that they must also be affected.

In a practice of the ACDC mechanism, the access controls are applied at the network side. It is proposed to associate the communications of emergent applications with a particular Access Point Name (APN) which only provides emergency services, and when ACDC is enabled, the network only allows the communications associated with this particular APN. Even though some other applications may fake the association with the particular APN and have their access attempts sent out to the network, their access attempts will eventually fail at the network side since the particular APN does not provide normal services. However, this design cannot prevent such access attempts from being sent out to the network, causing radio resources of the network to be wastefully occupied, especially when there are many User Equipment (UE) doing so.

BRIEF SUMMARY OF THE APPLICATION

In a first aspect of the application, a mobile communication device comprising a wireless transceiver and a controller is provided. The wireless transceiver is configured to perform wireless transmission and reception to and from a cell. The controller is configured to determine whether an ACDC has been enabled in the cell in response to a Domain Name Server (DNS) query or Internet Protocol (IP) packet initiated by an application, and in response to the ACDC having been enabled, respond to the DNS query with an IP address or transmit the IP packet to the cell via the wireless transceiver only when the application is associated with a high-priority service.

In a second aspect of the application, a method for ACDC, executed by a mobile communication device wirelessly communicating with a cell, is provided. The method comprises the steps of: determining whether the ACDC has been enabled in the cell in response to a DNS query or IP packet initiated by an application; and in response to the ACDC having been enabled, responding to the DNS query with an IP address or transmitting the IP packet to the cell via the wireless transceiver only when the application is associated with a high-priority service.

In a third aspect of the application, a non-transitory machine-readable storage medium comprising a computer program, which, when executed, causes a mobile communication device wirelessly communicating with a cell to perform a method for an ACDC, is provided. The method comprises the steps of: determining whether the ACDC has been enabled in the cell in response to a DNS query or IP packet initiated by an application; and in response to the ACDC having been enabled, responding to the DNS query with an IP address or transmitting the IP packet to the cell via the wireless transceiver only when the application is associated with a high-priority service.

Other aspects and features of the invention will become apparent to those with ordinary skill in the art upon review of the following descriptions of specific embodiments of the mobile communication devices and methods for ACDC, and storage medium thereof.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof.

Figure 1:
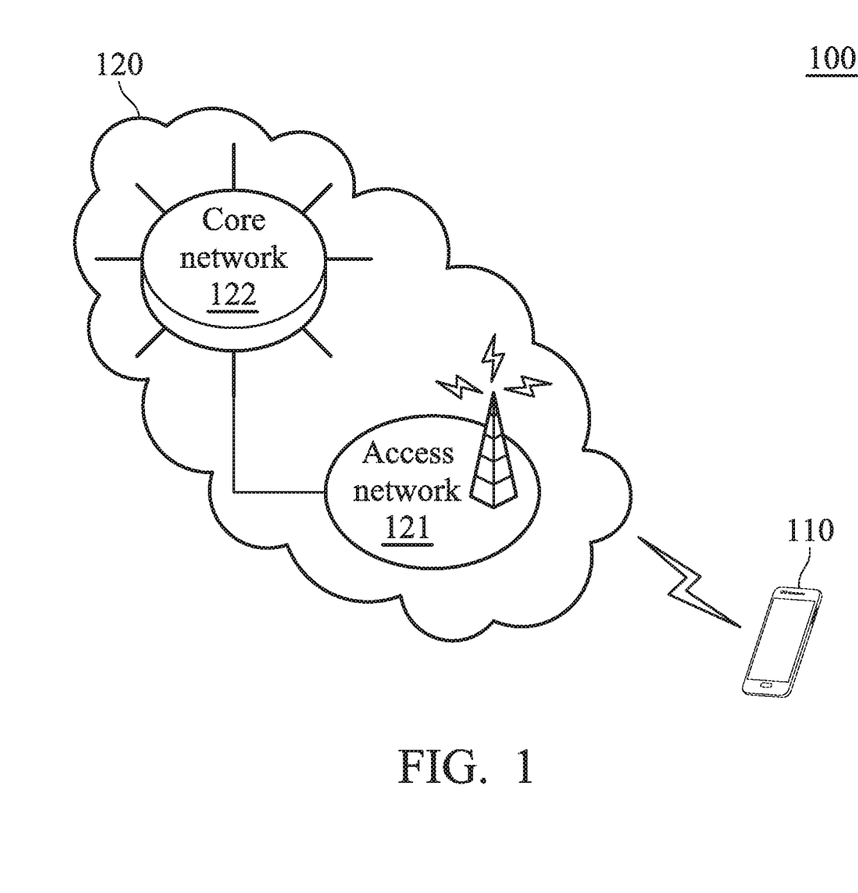
FIG. 1 is a block diagram of a wireless communication environment according to an embodiment of the application.

FIG. 1 is a block diagram of a wireless communication environment according to an embodiment of the application.

The wireless communication environment 100 comprises a mobile communication device 110 and a service network 120, wherein the mobile communication device 110 is wirelessly connected to the service network 120 for obtaining mobile services. The mobile communication device 110 may be a feature phone, a smartphone, a panel Personal Computer (PC), a laptop computer, or any computing device supporting the wireless technology utilized by the service network 120. The service network 120 may be a cellular network, such as an LTE/LTE-A/TD-LTE network.

Specifically, the service network 120 comprises an access network 121 and a core network 122, wherein the access network 121 is responsible for processing radio signals, terminating radio protocols, and connecting the mobile communication device 110 with the core network 122, while the core network 122 is responsible for performing mobility management, network-side authentication, and interfaces with public/external networks (e.g., the Internet). Each of the access network 121 and the core network 122 may comprise one or more network nodes for carrying out said functions. For example, if the service network 120 is an LTE/LTE-A/TD-LTE network, the access network 121 may be an Evolved-UTRAN (E-UTRAN) which includes at least an evolved NB (eNB) (e.g., a macro eNB, femto eNB, or pico eNB), and the core network 122 may be an Evolved Packet Core (EPC) which includes at least a Home Subscriber Server (HSS), a Mobility Management Entity (MME), a Serving Gateway (S-GW), and one or more Packet Data Network Gateways (PDN-GWs or P-GWs) to one or more Packet Data Networks (PDNs), such as Internet, private networks, emergency networks, or the like.

In order for the mobile communication device 110 to access a desired PDN, the mobile communication device 110 may specify to the service network 120 an Access Point Name (APN) that corresponds to the desired PDN. For example, if the user of the mobile communication device 110 requests to access the Internet, the mobile communication device 110 specifies to the service network 120 an APN that corresponds to the Internet. The mobile communication device 110 then receives data services through the service network 120 from the PDN represented by the APN. That is, the usage of a packet data connection to a PDN is restricted to a specific service, and this service can only be accessed via a corresponding APN. For example, there may be one APN for general Internet services, one APN for the Multimedia Message Service (MMS), one APN for IP Multimedia Subsystem (IMS) services, and one APN for emergency services (e.g., the Disaster Message Board (DMB) service, and disaster voice messaging service).

Figure 2:
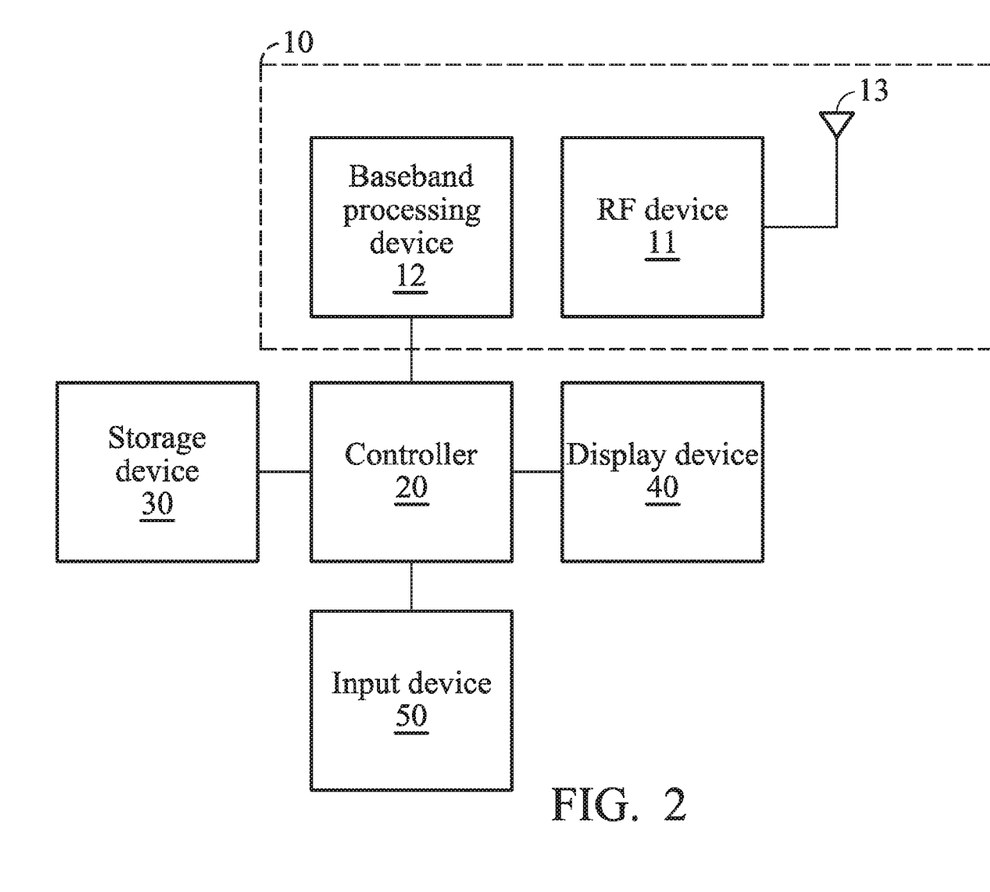
FIG. 2 is a block diagram illustrating the mobile communication device 110 according to an embodiment of the application.

FIG. 2 is a block diagram illustrating the mobile communication device 110 according to an embodiment of the application. The mobile communication device 110 comprises a wireless transceiver 10, a controller 20, a storage device 30, a display device 40, and an input device 50. The wireless transceiver 10 is configured to perform wireless transmission and reception to and from the service network 140 and other nearby mobile communication devices. The wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported wireless technology, wherein the radio frequency may be 900 MHz, 2100 MHz, or 2.6 GHz utilized in LTE/LTE-A/TD-LTE technology, or another radio frequency, such as an unlicensed frequency band (e.g., 2.4 GHz) or a licensed frequency band for another wireless technology.

The controller 20 may be a general-purpose processor, a Micro Control Unit (MCU), an application processor, a Digital Signal Processor (DSP), or the like, for controlling the wireless transceiver 10 for wireless communications with the service network 140 and other nearby mobile communication devices, storing and retrieving data to and from the storage device 30, sending a series of frame data (e.g. representing text messages, graphics, images, etc.) to the display device 40, receiving signals from the input device 50. In particular, the controller 20 coordinates the aforementioned operations of the wireless transceiver 10, the storage device 30, the display device 40, and the input device 50 for performing the method for ProSe UE-to-network relay.

In another embodiment, the controller 20 may be incorporated into the baseband processing device 12, serving as a baseband processor.

The storage device 30 is a non-transitory machine-readable storage medium, including a memory, such as a FLASH memory or a Non-volatile Random Access Memory (NVRAM), or a magnetic storage device, such as a hard disk or a magnetic tape, or an optical disc, or any combination thereof for storing ACDC cell information, a mapping relation between a Uniform Resource Locator (URL) and an Internet Protocol (IP) address for a high-priority service, and/or instructions and/or program code of applications, communication protocols, and/or the method of the present application.

The display device 40 may be a Liquid-Crystal Display (LCD), Light-Emitting Diode (LED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 2 are for illustrative purposes only and are not intended to limit the scope of the application.

Figure 3A:
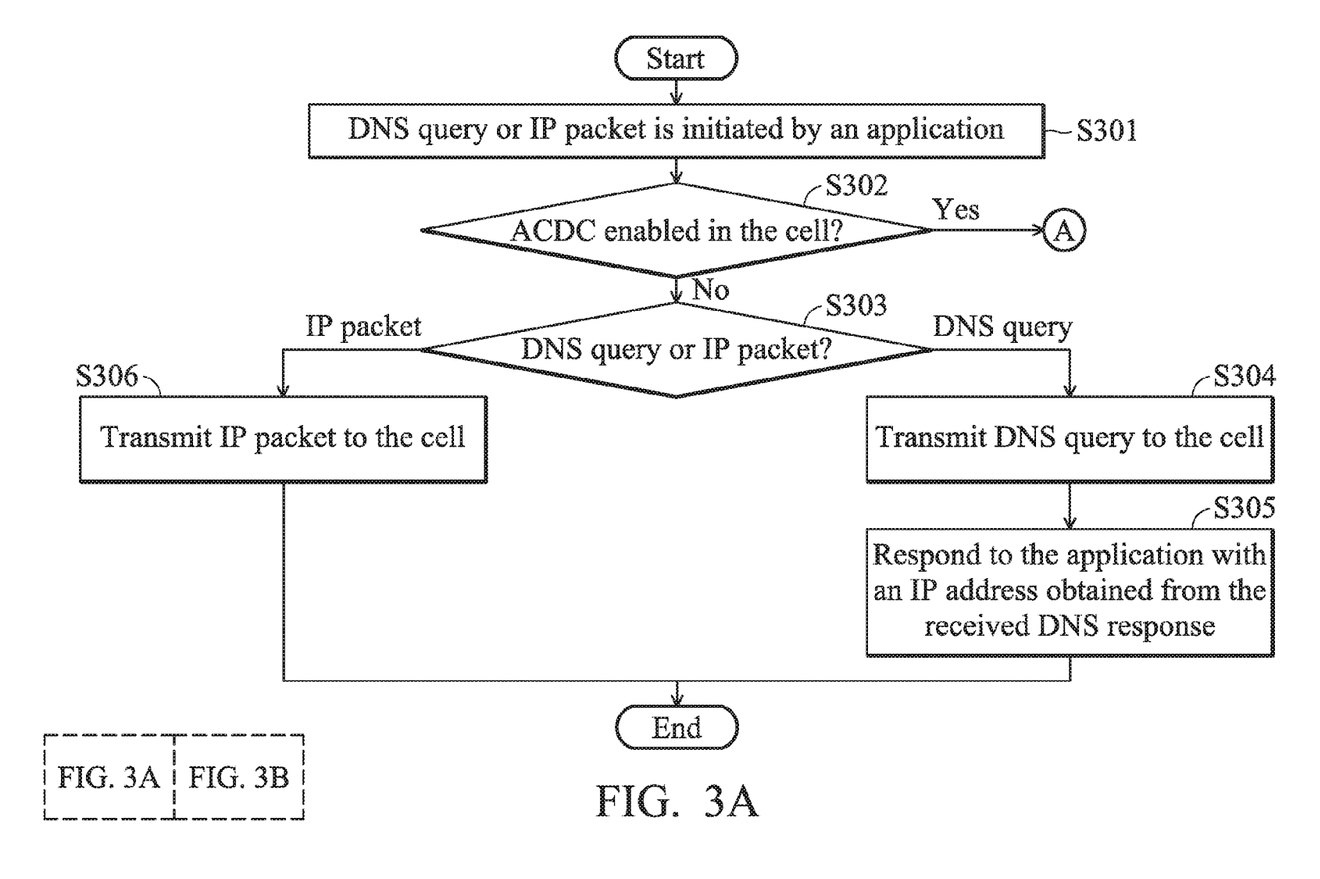
FIGS. 3A and 3B show a flow chart illustrating the method for ACDC according to an embodiment of the application.
Figure 3B:
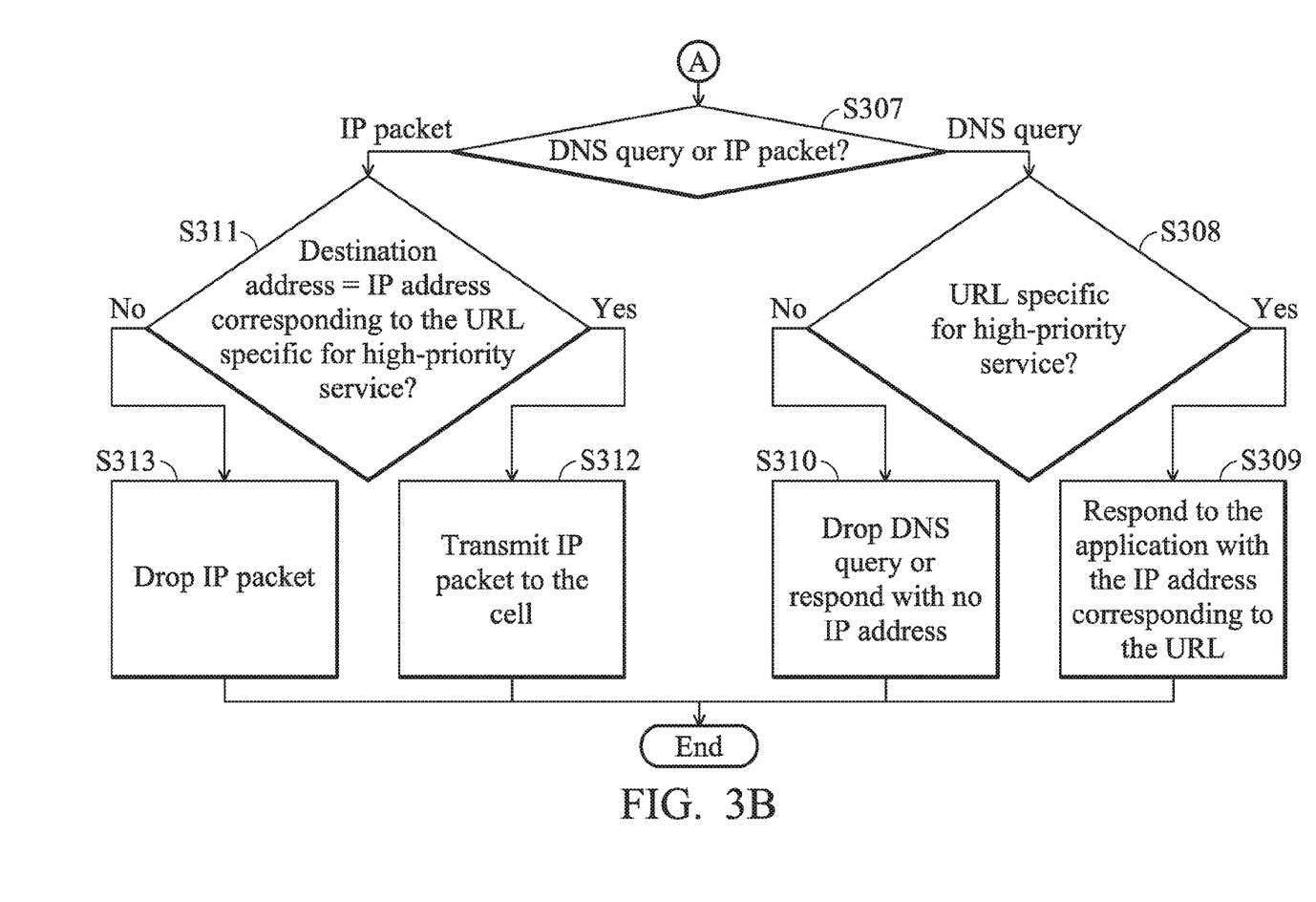

FIGS. 3A and 3B show a flow chart illustrating the method for ACDC according to an embodiment of the application. In this embodiment, the method is applied to a mobile communication device, such as the mobile communication device 110. To begin, a DNS query or IP packet is initiated by an application in the mobile communication device (step S301). In response to the DNS query or IP packet, it is determined whether ACDC has been enabled in the cell on which the mobile communication device is currently camped (step S302). If ACDC has not been enabled in the cell, the mobile communication device determines whether it's a DNS query or IP packet initiated by the application in step S301 (step S303).

Next, if it's a DNS query, the mobile communication transmits the DNS query to the cell (step S304), and responds to the application with an IP address obtained from the received DNS response (step S305), and the method ends. Otherwise, if it's an IP packet, the mobile communication device transmits the IP packet to the cell (step S306), and the method ends.

Specifically, in step S304, the DNS query includes the IP address of a specific DNS, so that the DNS query is transmitted to cell to be forwarded to the DNS. The IP address of the DNS may be obtained from the Packet Data Protocol (PDP) context of a PDP connection established between the mobile communication device and the service network to which the cell belongs.

Subsequent to step S302, if ACDC has been enabled in the cell, the mobile communication device determines whether it's a DNS query or IP packet initiated by the application in step S301 (step S307). If it's a DNS query, the mobile communication device determines whether the URL included in the DNS query is specific for a high-priority service according to the system information broadcasted in the cell (step S308), and if so, determines the IP address corresponding to the URL according to the system information broadcasted in the cell and responds to the application with the IP address (step S309), and the method ends. Otherwise, if the URL included in the DNS query is not specific for a high-priority service, the mobile communication device drops the DNS query (i.e., does not respond to the application) or responds to the application with no IP address (step S310), and the method ends.

In one embodiment, the cell may broadcast the URL and IP address for the high-priority service, and the mobile communication device may establish the mapping relation between the URL and IP address for the high-priority service as soon as it is camped on the cell. In other words, a virtual DNS is setup locally in the mobile communication device, so that the mobile communication device may directly respond to the application with a DNS response without actually sending out the DNS query to the cell.

Subsequent to step S307, if it's an IP packet, the mobile communication device determines whether the destination address of the IP packet is the IP address corresponding to the URL specific for a high-priority service (step S311), and if so, transmits the IP packet to the cell (step S312), and the method ends. Otherwise, if the destination address of the IP packet is not the IP address corresponding to the URL specific for a high-priority service, the mobile communication device drops the IP packet (i.e., does not transmit the IP packet) (step S313), and the method ends.

Figure 4:
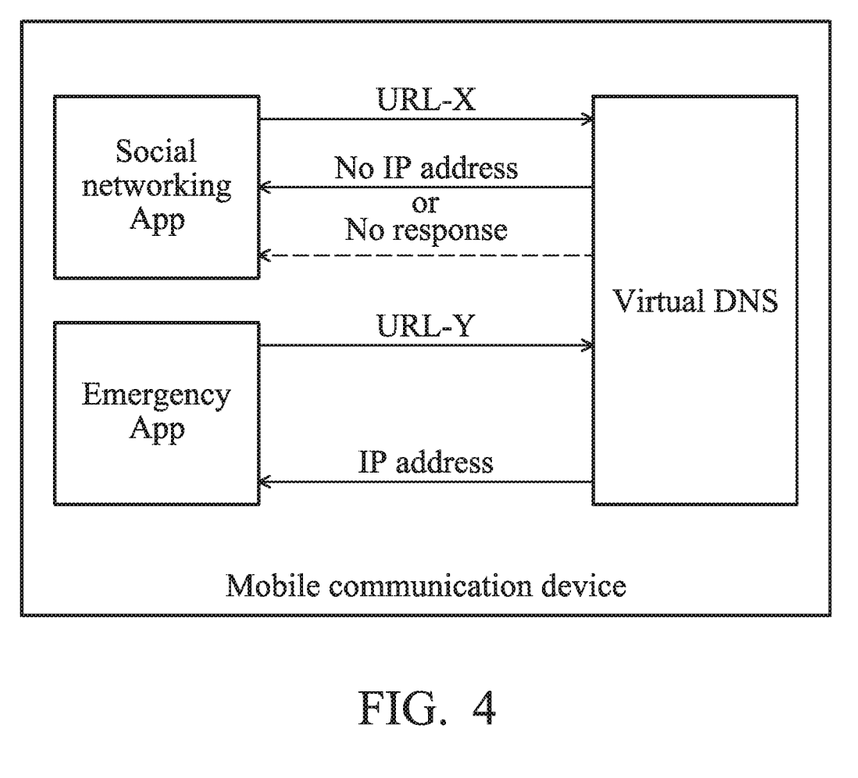
FIG. 4 is a schematic diagram illustrating exemplary DNS queries with a virtual DNS locally setup in a mobile communication device according to an embodiment of the application.

FIG. 4 is a schematic diagram illustrating exemplary DNS queries with a virtual DNS locally setup in a mobile communication device according to an embodiment of the application. In this embodiment, the virtual DNS stores the mapping relation between the URL and IP address for the DMS (i.e., an example of high-priority service), and only responds to the DNS query which includes the URL of the DMS. The URL and IP address for the DMS may be obtained from the system information broadcast(s) of the service network with which the mobile communication device is wirelessly communicating.

As shown in FIG. 4, when the social networking application initiates a DNS query including the URL (denoted as URL-X in FIG. 4) of a server associated with the social networking application, the virtual DNS responds to the social networking application with a DNS response including no IP address, or does not respond at all.

When an emergency application initiates a DNS query including the URL (denoted as URL-Y in FIG. 4) of a server associated with the DMS, the virtual DNS directly responds to the emergency application with a DNS response including the IP address of the DMS server, without sending out the DNS query to the real DNS (which may be established in the service network or on the Internet).

Figure 5:
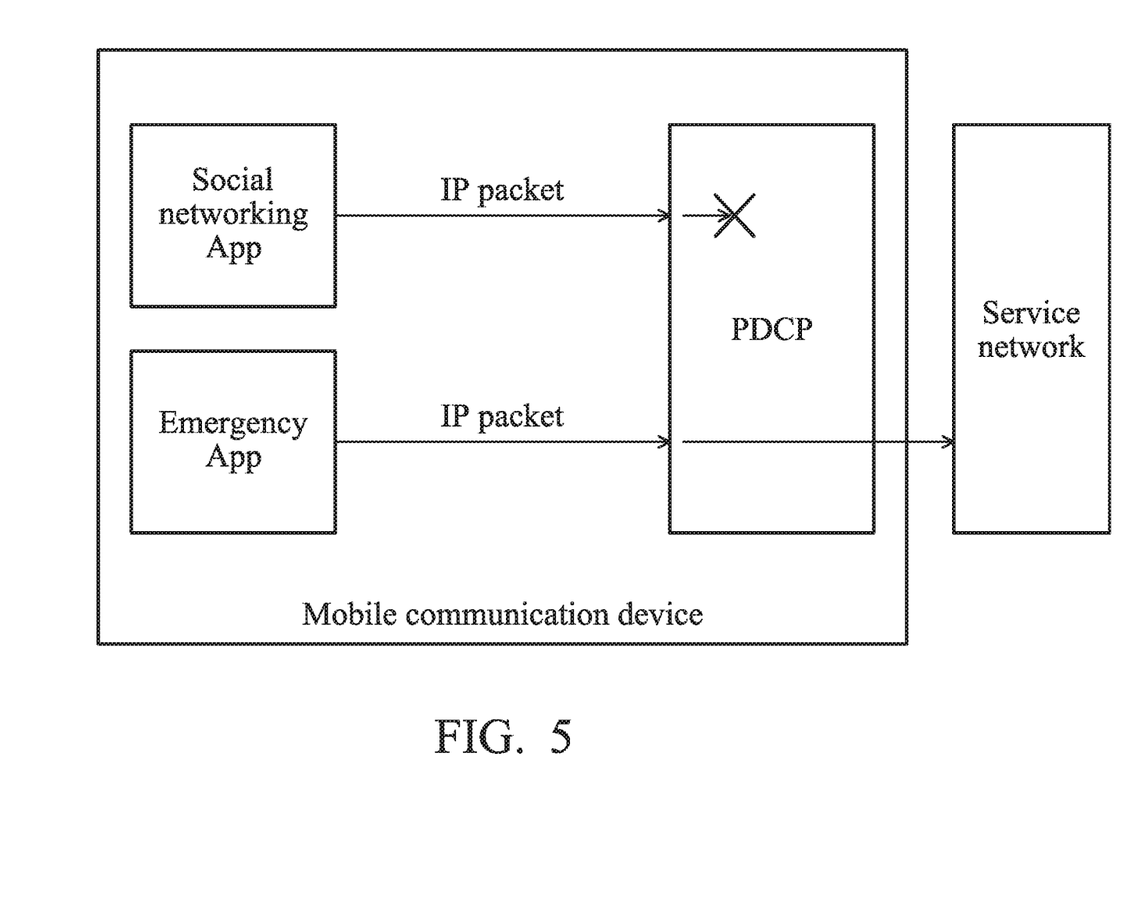
FIG. 5 is a schematic diagram illustrating exemplary handling of outgoing IP packets in a mobile communication device according to an embodiment of the application.

FIG. 5 is a schematic diagram illustrating exemplary handling of outgoing IP packets in a mobile communication device according to an embodiment of the application. In this embodiment, the outgoing IP packets are processed in the Packet Data Convergence Protocol (PDCP) layer to be determined whether they can be sent out to the service network which the mobile communication device is wirelessly communicating with.

As shown in FIG. 5, the social networking application is blocked in the PDCP layer from sending IP packets to the service network, while the emergency application is allowed to send IP packets to the service network. Specifically, the PDCP layer checks if the destination address of an IP packet is the same as the IP address of the DMS server, and drops the IP packet if its destination address is not the IP address of the DMS server.

It should be understood that the embodiment of FIG. 5 is for illustrative purposes only and the handling of outgoing IP packets may be implemented in another layer.

In view of the forgoing embodiments of FIGS. 3A, 3B, 4, and 5, it will be appreciated that the present application realizes enhanced ACDC by preventing the IP packets initiated by normal or low priority services from being sent out to the service network. Advantageously, this reserves radio resources of the service network for communications associated with high-priority services only.

While the application has been described by way of example and in terms of preferred embodiment, it should be understood that the application is not limited thereto. Those who are skilled in this technology can still make various alterations and modifications without departing from the scope and spirit of this application. Therefore, the scope of the application shall be defined and protected by the following claims and their equivalents.

What is claimed is:

1. A mobile communication device, comprising:
   a wireless transceiver, configured to perform wireless transmission and reception to and from a cell; and
   a controller, configured to determine whether an Application-specific Congestion control for Data Communication (ACDC) has been enabled in the cell in response to a Domain Name Server (DNS) query or Internet Protocol (IP) packet initiated by an application, and in response to the ACDC having been enabled, determine whether the DNS query comprises a Uniform Resource Locator (URL) specific for a high-priority service or whether a destination address of the IP packet is an IP address corresponding to the URL specific for the high-priority service, and respond to the DNS query with the IP address when the DNS query comprises the URL specific for the high-priority service, or transmit the IP packet via the wireless transceiver when the destination address of the IP packet is the IP address corresponding to the URL specific for the high-priority service.

2. The mobile communication device of claim 1, wherein the controller is further configured to receive information concerning the URL and the IP address from the cell, so as to provide a virtual DNS within the mobile communication device for responding to the DNS query.

3. The mobile communication device of claim 1, wherein the controller is further configured to not respond to the DNS query or respond to the DNS query with no address when the DNS query does not comprise the URL specific for the high-priority service, or not transmit the IP packet to the cell via the wireless transceiver when the destination address of the IP packet is not the IP address corresponding to the URL specific for the high-priority service.

4. The mobile communication device of claim 1, wherein, in response to the ACDC not having been enabled in the cell, the controller is further configured to transmit the DNS query or the IP packet to the cell via the wireless transceiver.

5. The mobile communication device of claim 1, wherein the high-priority service is a Disaster Message Board (DMB) service or a disaster voice messaging service associated with an Access Point Name (APN) for emergency.

6. A method for Application-specific Congestion control for Data Communication (ACDC), executed by a mobile communication device wirelessly communicating with a cell, the method comprising:
    determining whether the ACDC has been enabled in the cell in response to a Domain Name Server (DNS) query or Internet Protocol (IP) packet initiated by an application;
    in response to the ACDC having been enabled, determining whether the DNS query comprises a Uniform Resource Locator (URL) specific for a high-priority service or whether a destination address of the IP packet is an IP address corresponding to the URL specific for the high-priority service; and
    responding to the DNS query with the IP address when the DNS query comprises the URL specific for the high-priority service, or transmitting the IP packet when the destination address of the IP packet is the IP address corresponding to the URL specific for the high-priority service.

7. The method of claim 6, further comprising:
    receiving information concerning the URL and the IP address from the cell, so as to provide a virtual DNS within the mobile communication device for responding to the DNS query.

8. The method of claim 6, further comprising:
    not responding to the DNS query or responding to the DNS query with no address when the DNS query does not comprise the URL specific for the high-priority service, or not transmitting the IP packet to the cell when the destination address of the IP packet is not the IP address corresponding to the URL specific for the high-priority service.

9. The method of claim 6, further comprising:
    in response to the ACDC not having been enabled in the cell, transmitting the DNS query or the IP packet to the cell.

10. The method of claim 6, wherein the high-priority service is a Disaster Message Board (DMB) service or a disaster voice messaging service associated with an Access Point Name (APN) for emergency.

11. A non-transitory machine-readable storage medium comprising a computer program which, when executed, causes a mobile communication device wirelessly communicating with a cell to perform a method for an Application-specific Congestion control for Data Communication (ACDC), wherein the method comprises:
    determining whether the ACDC has been enabled in the cell in response to a Domain Name Server (DNS) query or Internet Protocol (IP) packet initiated by an application;
    in response to the ACDC having been enabled, determining whether the DNS query comprises a Uniform Resource Locator (URL) specific for a high-priority service or whether a destination address of the IP packet is an IP address corresponding to the URL specific for the high-priority service; and
    responding to the DNS query with the IP address when the DNS query comprises the URL specific for the high-priority service, or transmitting the IP packet when the destination address of the IP packet is the IP address corresponding to the URL specific for the high-priority service.

12. The non-transitory machine-readable storage medium of claim 11, wherein the method further comprises:
    receiving information concerning the URL and the IP address from the cell, so as to provide a virtual DNS within the mobile communication device for responding to the DNS query.

13. The non-transitory machine-readable storage medium of claim 11, wherein the method further comprises:
    not responding to the DNS query or responding to the DNS query with no address when the DNS query does not comprise the URL specific for the high-priority service, or not transmitting the IP packet to the cell when the destination address of the IP packet is not the IP address corresponding to the URL specific for the high-priority service.

14. The non-transitory machine-readable storage medium of claim 11, wherein the method further comprises:
    in response to the ACDC not having been enabled in the cell, transmitting the DNS query or the IP packet to the cell.

15. The non-transitory machine-readable storage medium of claim 11, wherein the high-priority service is a Disaster Message Board (DMB) service or a disaster voice messaging service associated with an Access Point Name (APN) for emergency.

* * * * *